United States Patent
Sano et al.

[11] Patent Number: 5,941,670
[45] Date of Patent: Aug. 24, 1999

[54] BOLT FASTENER

[75] Inventors: Takahiro Sano; Masashi Denndou, both of Toyohashi, Japan

[73] Assignee: Emhart Inc., Newark, Del.

[21] Appl. No.: 09/104,138

[22] Filed: Jun. 24, 1998

[30] Foreign Application Priority Data

Jun. 24, 1997 [JP] Japan .................................. 9-167160

[51] Int. Cl.⁶ .............................. F16B 37/08; F16B 37/16
[52] U.S. Cl. .......................... 411/433; 411/437; 411/512; 411/908
[58] Field of Search .................................... 411/267, 270, 411/433, 437, 512, 908

[56] References Cited

U.S. PATENT DOCUMENTS

| | | | |
|---|---|---|---|
| 4,828,444 | 5/1989 | Oshida | 411/437 |
| 4,990,044 | 2/1991 | Kimak | 411/437 X |
| 5,302,070 | 4/1994 | Kameyama et al. | 411/437 |
| 5,660,513 | 8/1997 | Shibanushi | 411/437 X |

*Primary Examiner*—Neill Wilson

[57] ABSTRACT

A bolt fastener (1) is attachable to a bolt (23) by pressing the base (3) onto the bolt to receive the bolt in a receiving hole (2) of the base (3), while the fastener (1) has an increased pulling resistance force (pulling load) against a pulling force of the fastener from the bolt. An inner wall (9) of the bolt receiving hole (2) is provided with a pair of opposed engagement means (10) member into engagement with a threaded portion of the bolt as the received in the bolt receiving hole (2). Each of the engagement means (10) comprises a plurality of resilient arms (15,17) extending from the inner wall (9) of the bolt receiving hole (21) toward the center of the hole and a plate-like engagement portion (18) supported by the resilient arms to extend longitudinally with respect to the bolt receiving hole. Each of the opposed surfaces of the engagement portions (18) of the paired engagement means (10) is formed with a plurality of multi-stepped engagement pawls (19) arranged longitudinally with respect to the bolt receiving hole (2) for engagement with threaded portion of the bolt (23).

6 Claims, 6 Drawing Sheets

BOLT FASTENER

BACKGROUND OF THE INVENTION

The present invention relates to a bolt fastener comprising a base having a bolt receiving hole formed to receive a bolt projecting from a panel, with an inner wall of the bolt receiving hole formed with a pair of opposed engagement means to engage with a threaded portion of the received bolt and, more specifically, to a bolt fastener adapted to hold a fuel pipe, a brake pipe or the like through its engagement with a bolt such as a stud bolt projecting from the panel of a vehicle body or the like.

Bolt fasteners capable of holding a fuel pipe, a brake pipe or the like to a panel such as a vehicle body by making use of a stud or a bolt provided to project from the panel have been developed. A typical example of such a bolt fastener has a base formed with a bolt receiving hole to receive a bolt fixed to the panel, and a pipe holder which extends integrally sideways from the base and holds pipes pressed into opened portions thereof, and the bolt receiving hole of the base is formed with engagement pawls to engage with a threaded portion of the received bolt. In the mounting operation, where the pipes are held in the pipe holders, the receiving hole of the base is held to the bolt and the base is simply pressed down. The base is then fixed to the panel and the pipes held in the pipe holder are fixedly placed on the panel.

Such a bolt fastener is convenient in that pipes can be mounted on the panel when the base is simply pressed onto the bolt. Nevertheless, even this bolt fastener has a problem still to be solved. The problem with conventional bolt fasteners is that only limited portions of the engagement pawls catch the threaded portion of the bolt, which makes it impossible to increase the resistance force (pulling load) against a force to pull the bolt fastener out from the bolt.

SUMMARY OF THE INVENTION

Accordingly, it is an object of the present invention to provide a bolt fastener that can have an increased resistance force (pulling load) against a force to pull the fastener out from the bolt while maintaining operational facility that allows the fastener to be attached simply when the receiving hole of the base is pressed onto the bolt.

The present invention provides a bolt fastener comprising a base having a bolt receiving hole formed to receive a bolt projecting from a panel therein, with the bolt receiving hole including an inner wall formed with a pair of opposed engagement means for engagement with a threaded portion of the received bolt; characterised in that each of the engagement means comprises a plurality of resilient arms extending from the inner wall of the bolt receiving hole toward the centre of the hole, and a plate-like engagement portion which is supported by the resilient arms and extend longitudinally with respect to the bolt receiving hole, and the opposed surfaces of the engagement portions are provided with a plurality of engagement pawls translatedly arranged longitudinally with respect to the bolt receiving hole for engagement with a threaded portion of the bolt.

The above structure allows the engagement pawls of the engagement portions to engage with a plurality of threads to ensure a large engagement area, and the engagement of the engagement pawls is maintained stably and firmly by the resilience of the resilient arms supporting the engagement portions. Therefore, the fastener has an increased engagement force with the bolt and the resistance force (pulling load) against a force to pull out the fastener from the bolt can be increased.

The resilient arms of each engagement means are preferably formed as four resilient arms to support the four corners of each engagement portion. It is preferred that each resilient arm extends toward the inlet side of the bolt receiving force, and makes an acute angle with the inner wall of the bolt receiving hole, and a parallelogram can be formed by the inner wall of the receiving hole, the resilient arm in an inlet side portion of the receiving hole, the resilient arm in an outlet side portion of the receiving hole, and an engagement portion supported by the resilient arms. Resilience of the resilient arms forming the parallelograms, rigidity of the engagement portions and the multi-step engagement pawls ensure that the engagement pawls engage with whichever threads coming to engagement positions, and that the engagement portions engage with the bolt stably in a large engagement area. It is preferable to form cutouts at the portions of each inner wall adjacent the root of the resilient arms so that the resilient arms can change their shape easily. It is also preferable to make the bolt receiving hole of the base in an elongated form so as to absorb an offset of the mounting positions of the bolts on the panel, and to make the engagement portions wide enough correspondingly to the elongated hole. Preferably, each engagement portion is formed with a reinforcement rib on the opposite side to its engagement pawls so as to have a high rigidity.

BRIEF DESCRIPTION OF THE DRAWINGS

An embodiment, of a fastener will now be described with reference to the accompanying drawings, in which.

The bolt fastener 1 is formed as a one-piece pipe holder moulded from a plastics material. As illustrated, the bolt fastener 1 of the present invention is suitable for use as a pipe holder, but it is not limited to the illustrated bolt fastener configuration. Other examples of bolt fasteners according to the invention include, a fastener to join a plurality of panels placed one above each other and a fastener to connect another member to a panel through engagement thereof with a bolt projecting from the panel.

DETAILED DESCRIPTION OF THE INVENTION

Figure 1:
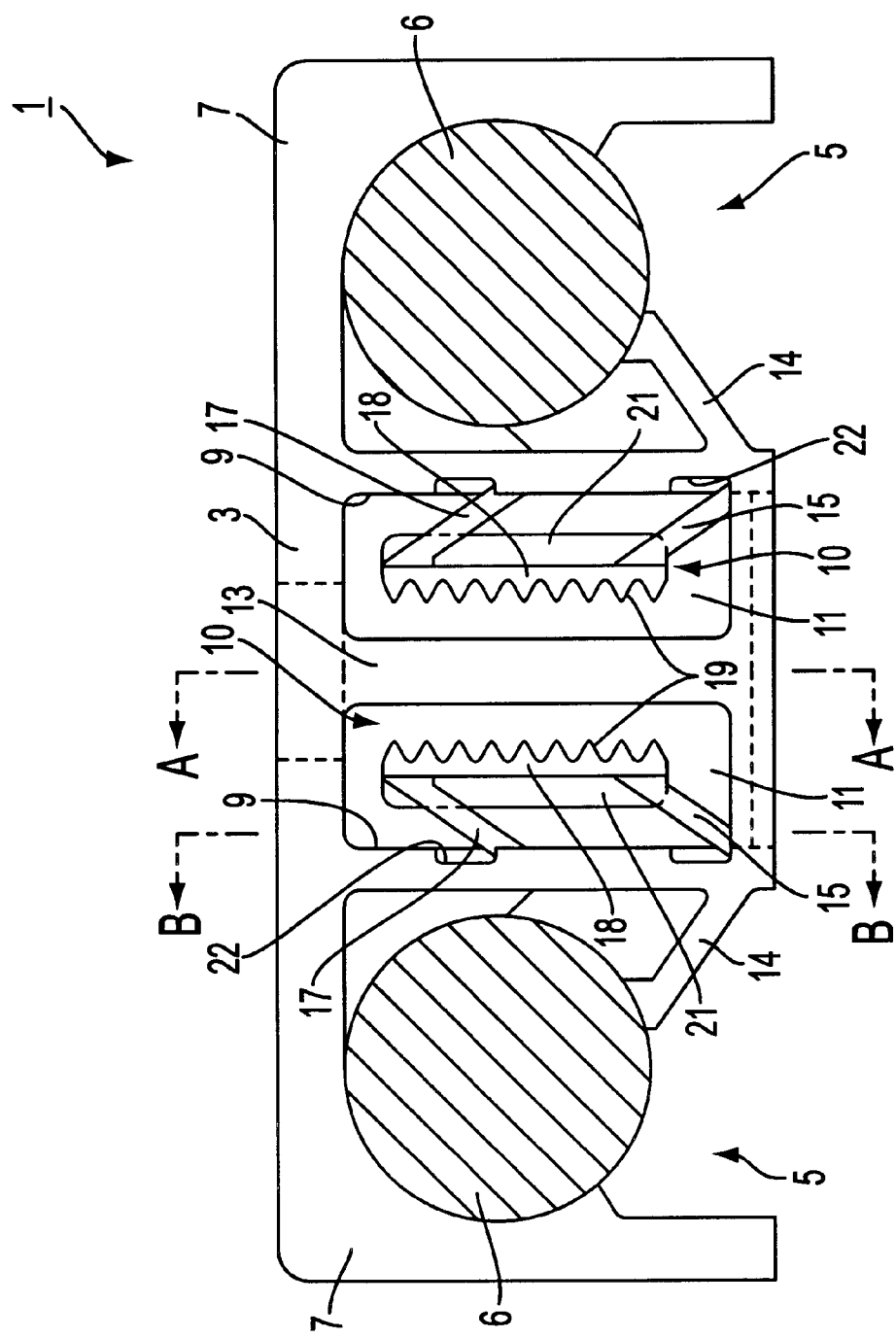
FIG. 1 is a front view of an embodiment bolt fastener of the present invention.
Figure 2:
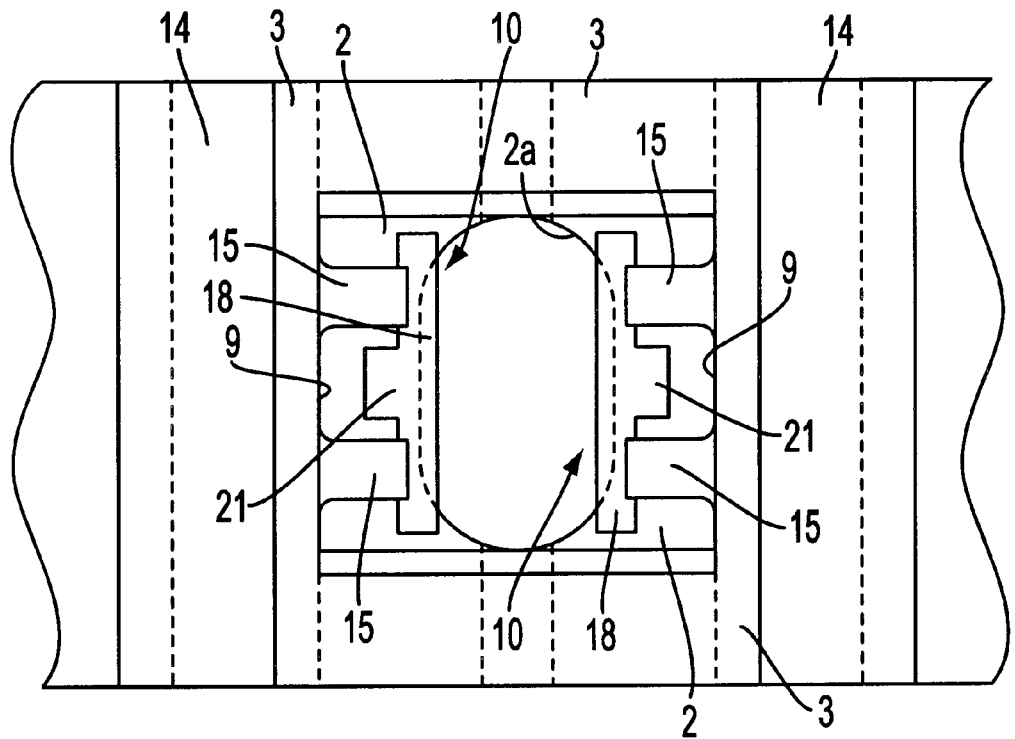
FIG. 2 is a bottom view of the bolt fastener of FIG. 1.
Figure 3:
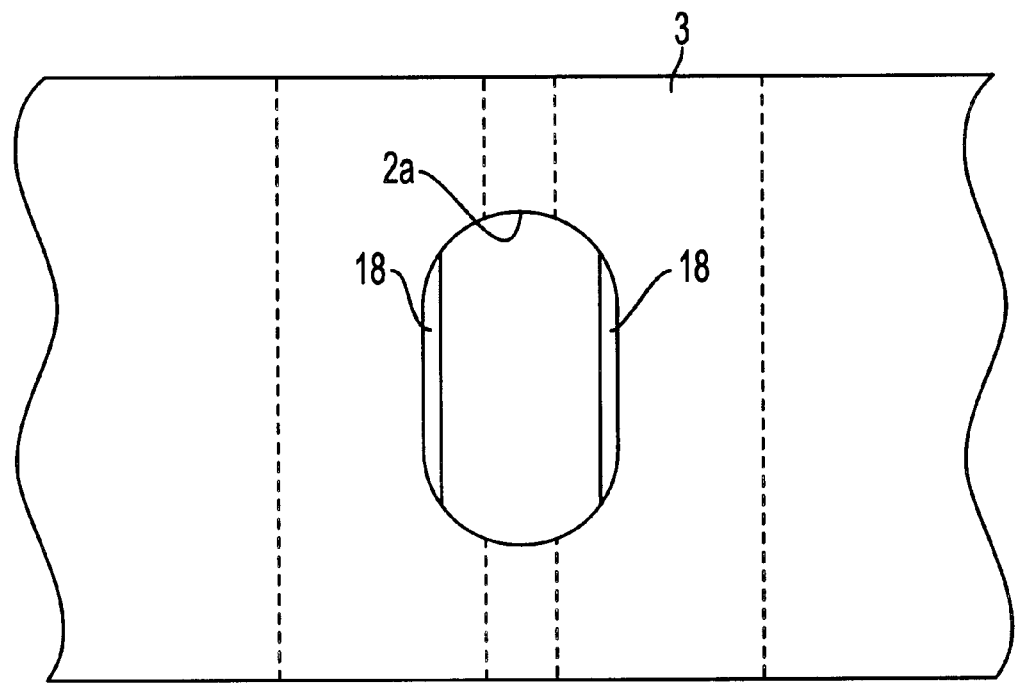
FIG. 3 is a plan view of the bolt fastener of FIG. 1.
Figure 4:
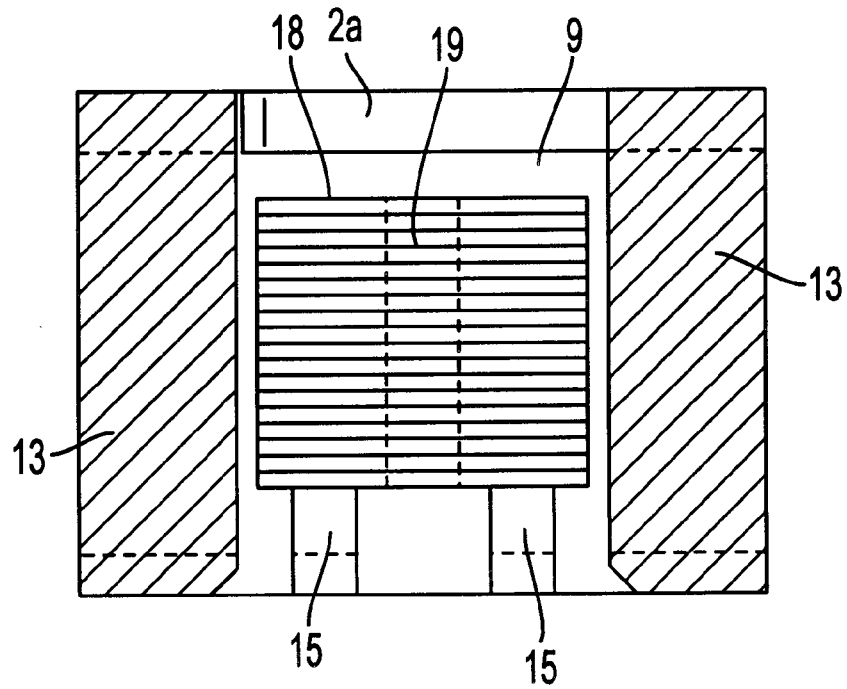
FIG. 4 is a sectional view of the bolt fastener taken along the line A—A of FIG. 1.

In the embodiment of FIG. 1, the bolt fastener 1 has a base 3 formed with a bolt receiving hole 2 to receive a bolt projecting from the panel and a pipe holder 7 extending sideways integrally from the base 3 for holding a pipe 6 by pressing the pipe 6 into an opening 5. As shown in FIG. 2, the bolt receiving hole 2 of the base 3 is formed to define a space which is substantially rectangular in section, with inner walls 9,9 facing each other which form outline of the bolt receiving hole 2. As shown in FIG. 1, the lower end of the bolt receiving hole 2 is on the inlet side for the bolt and the upper end is on the outlet side for the bolt, which penetrates the hole and extends from this portion. As shown in FIG. 3, a hole 2a on the outlet side is formed as an elongated hole so as to absorb an offset of the mounting positions of the bolts on the panel. The inner walls 9,9 of the bolt receiving hole 2 are respectively formed with engagement means 10 to engage with a threaded portion of the bolt. In FIG. 1, the base 3 is formed with windows 11 on its sides in order to form engagement means 10 in the bolt receiving hole 2 by moulding and a column 13 is formed in the centre of each window for maintaining the strength of the base 3 uniformly. From the bolt inlet side of the base 3, resilient holding members 14 to hold the pipes 6 extend toward the respective bases of the openings 5 of the pipe holder 7.

Engagement means 10 of a specific structure are provided on the inner walls 9 of the bolt receiving hole 2. The engagement means 10 are described in the following, with reference to FIGS. 1 to 5 and FIG. 6. Each of the engagement means 10 is made up of a plurality of resilient arms 15,17 extending from the inner wall 9 toward the centre of the hole, and a plate-like engagement portion 18 which is supported by the resilient arms 15 and 17 and extends longitudinally with respect to the bolt receiving hole 2. Each of opposed surfaces of the engagement means 18, which faces the threaded portion of the bolt, is provided with engagement pawls 19 to engage with the threaded portion of the bolt. The engagement pawls are multiple steps arranged longitudinally with respect to the bolt receiving hole. On the opposite side to the engagement pawls 19, each of the engagement portions 18 is formed with a reinforcement rib 21 to maintain high rigidity.

The resilient arm 15 (17) of each engagement means 10 respectively support the four corners of the plate-like engagement portion 18. In other words, each of the engagement portions 18 is supported by four resilient arms 15 and 17. Each resilient arm 15 (17), facing the inlet side of the bolt receiving hole 2 (the lower end side of FIG. 6), makes an acute angle θ with an inner wall 9, as can be seen from FIG. 6.

Figure 5:
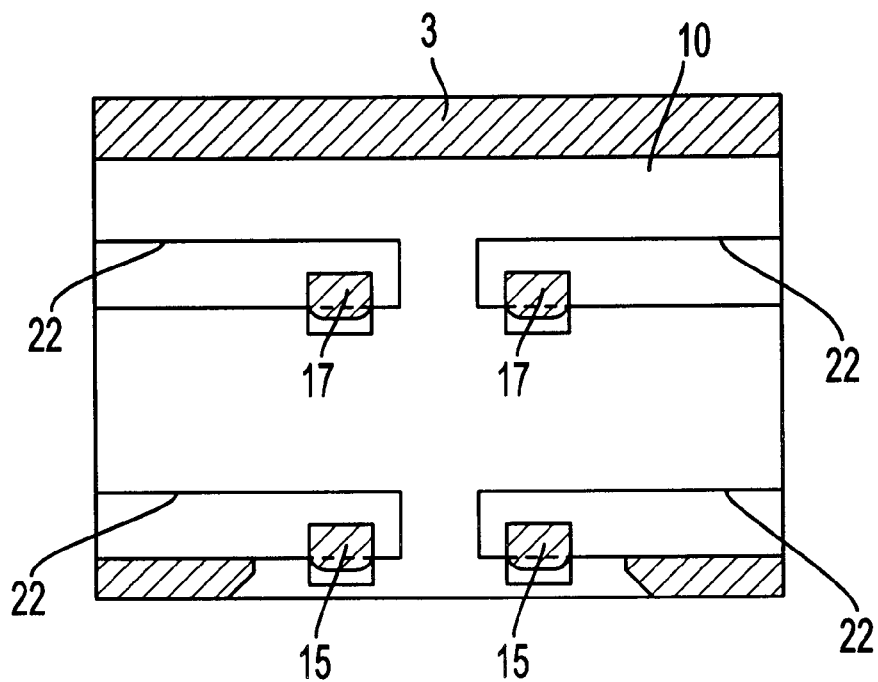
FIG. 5 is a sectional view of the bolt fastener taken along the line B=13 B of FIG. 1.
Figure 6A:
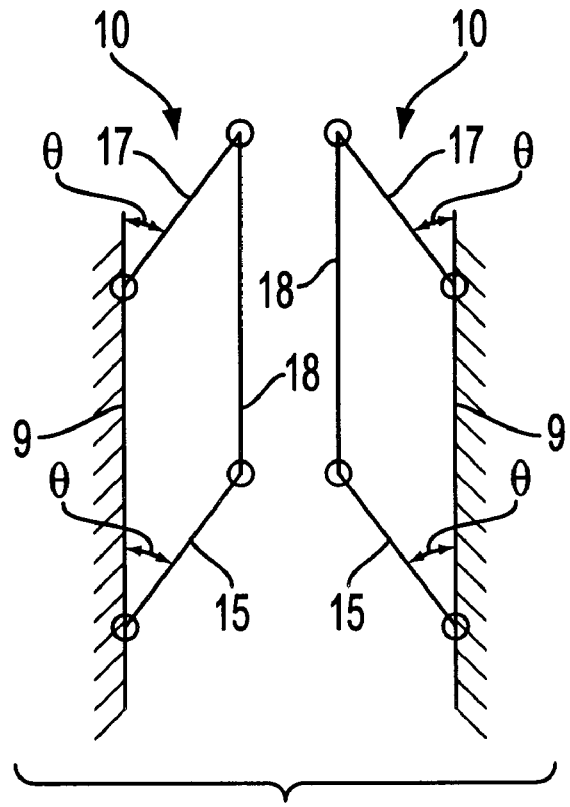
FIGS. 6(A) and (B) are explanatory diagrams for engagement means of the bolt fastener of FIG. 1, (A) shows an actual structure of the engagement means and (B) shows the principle of the engagement means.
Figure 6B:
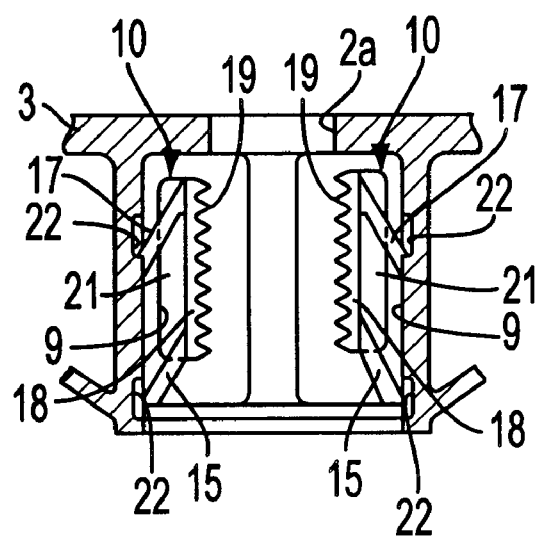

Accordingly, when the bolt receiving hole 2 is viewed from one side (i.e. a window 11), each engagement means 10 defines a parallelogram formed by the engagement portion 18, the resilient arm 15 supporting a portion of the engagement portion on the inlet side of the receiving hole, the resilient arm 17 supporting a portion of the engagement portion on the outlet side of the bolt receiving hole, and a portion of the inner wall 9 between the bases of the resilient arms 15 and 17. The parallelograms are shown schematically in FIG. 6(A). In this Figure, vertical sides 9 (inner walls) and 18 (engagement portions) are rigid and never change their forms, whereas upper and lower sides 17 and 15, extending diagonally are variable in shape. Therefore, the two parallelograms change the shapes so as to come closer to or get away from each other while the sides 18, i.e. the engagement portions 18 remain to be vertical. This means that the engagement portions 18 are held parallel to the threaded surface of the bolt. In the base portions of the resilient arms 15 and 17 in the inner walls 9, cutouts 22 are formed to enable the resilient arms to change their shapes easily, as best shown in FIGS. 5 and 6.

Figure 7A:
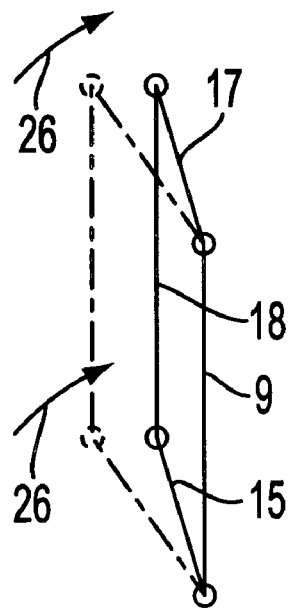
FIGS. 7(A) and (B) are explanatory diagrams for the engagement means in the process of pressing the bolt fastener of FIG. 1 onto a bolt, (A) shows an actual structure of the engagement means and (B) shows the operating principle of the engagement means, and FIGS. 8(A) and (B) are explanatory diagrams for the engagement means upon completion of pressing the bolt fastener of FIG. 1 onto a bolt, (A) shows an actual structure of the engagement means and (B) shows the operating principle of the engagement means.
Figure 7B:
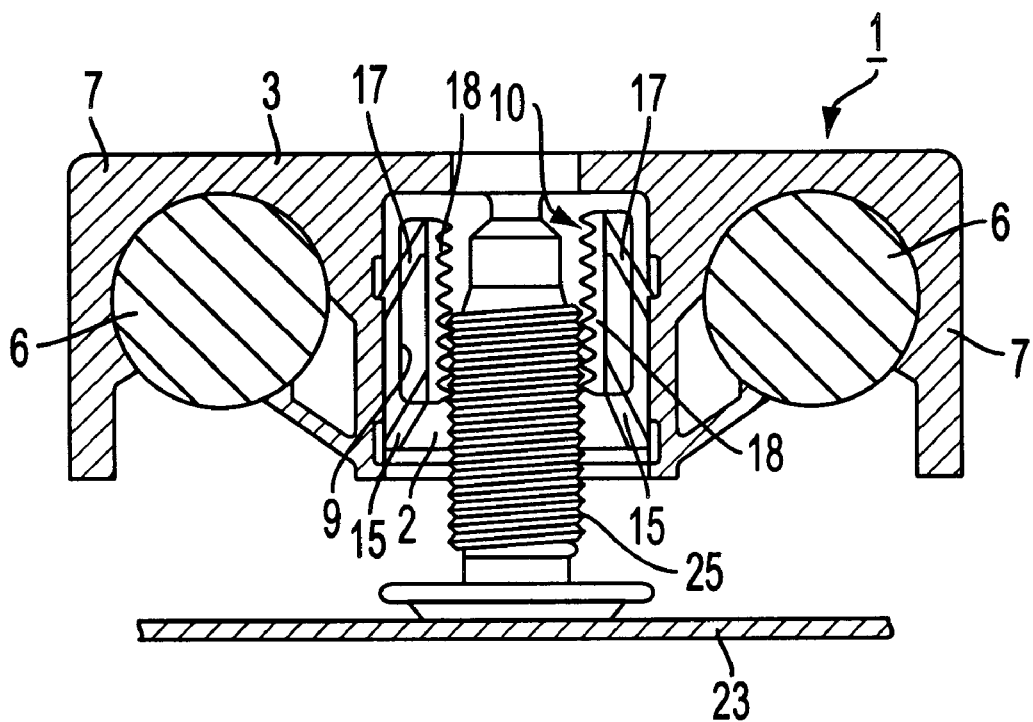

The operation to mount the pipes 6 on a panel 23 by using the bolt fastener 1 of the above-described structure are explained with reference to FIGS. 7 and 8. At predetermined points on the panel 23, which is a vehicle body or the like, bolts 25 for example, stud bolts, are fixed by welding or some other means. Bolt fasteners 1 are attached to predetermined positions of the pipes 6. The pipes 6 attached with bolt fasteners 1 at the predetermined positions thereof are brought to a place where the panel 23 is. Each bolt fastener 1 is pressed onto the corresponding bolt 25 to receive the bolt in the bolt receiving hole 2 (see FIG. 7). At the beginning of and during this pressing operation, as shown in FIG. 7(A), the resilient arms 15 and 17 are bent from the position shown by broken lines to the position indicated by solid lines, and then the engagement portion 18 then moves away from the threaded surface of the bolt 25. As mentioned earlier, the arms 15 and 17 are resilient while the engagement portions 18 and the inner walls 9 are rigid, and the resilient arms 15 and 17, the engagement portion 18 and the inner wall 9 form a parallelogram, so that the engagement portion 18 moves in the direction indicated by an arrow 26, in parallel with the inner wall 9. Since the surface of the inner wall 9 is substantially parallel to the threaded surface of the bolt 25, the engagement portion 18 moves from the bolt 25, parallel to the threaded surface of the bolt.

Figure 8A:
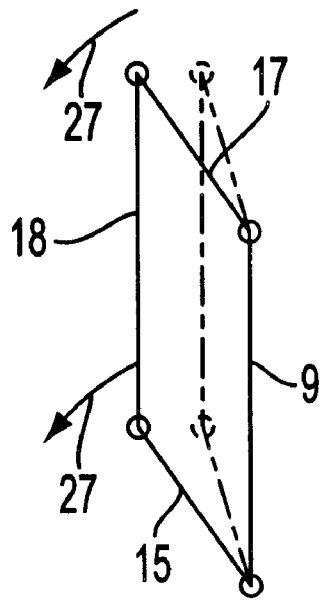
Figure 8B:
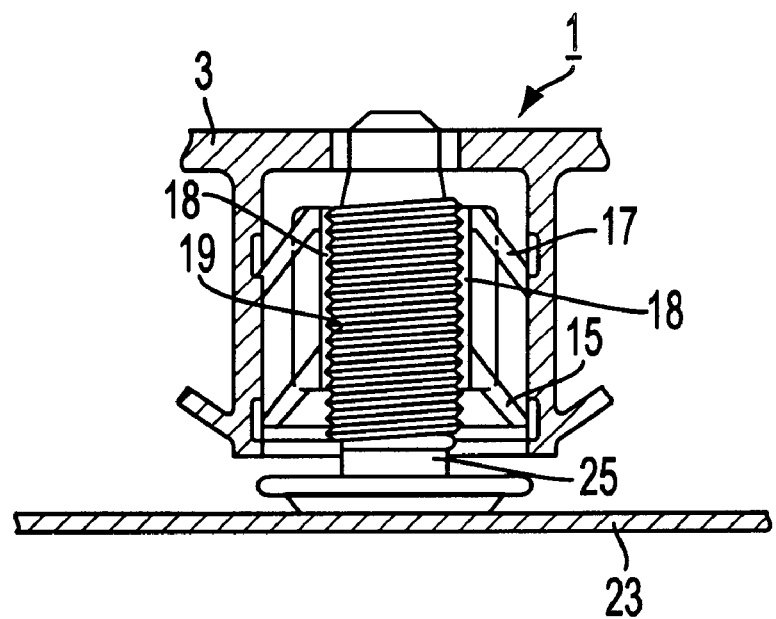

As illustrated in FIG. 8, upon completion of pressing the bolt fastener 1, the multi-step engagement pawls 19 of the engagement means 10 come into engagement with the complete threads of the bolt 25. When the pressing operation is finished, the resilient arms 15 and 17 which have bent as shown in FIG. 7(A) return from the positions shown by broken lines to those of solid lines as indicated by an arrow 27 in FIG. 8(A). In returning, the engagement portion 18 is moved from the position shown by a broken line to the position shown by a solid line while maintaining its perpendicular form, and comes into engagement with the threaded surface of the bolt 25. Accordingly, it is ensured that the multi-step engagement pawls 19 formed on the bolt-side surfaces of the engagement portions 18 engage with correspondingly positioned threads of the bolt 25, respectively. Thus, each of the engagement portions 18 and the threads of the bolt 25 are engaged with each other over a wide area and the engagement portion 18 is capable of engaging with the bolt 25 with an increased force. The engagement pawls 19 of one of the engagement portions 18 is staggered heightwise from the engagement pawls 19 of the other engagement portion 18 by a length corresponding to a half pitch of the threads of the bolt 25. This arrangement allows the engagement pawls 19 to engage fully with the corresponding threads of the bolt 25 and increases the engagement force of the engagement means with the bolt.

As described above, when the fastener 1 engages with the bolt 25 and is fixed, the pipes 6 are mounted on the panel 23. Because the multi-step engagement pawls 19 of the engagement portions 18 engage with the threaded portion of the bolt 25 at many points and their engagement is stable, the bolt fastener 1 has an increased resistant force against a force to pull out it from the bolt 26 (pulling load) and the pipes never leave the panel.

According to the present invention, the engagement pawls of the engagement portions engage with a plurality of threads to maintain a large engagement area, and engagement of the engagement pawls with the bolt is maintained stably and firmly owing to the resilience of the resilient arms supporting the engagement portions. Therefore, it has an increased engagement force with the bolt and the resistance force against a force to pull the fastener out from the bolt is also increased. In the present invention, it may be arranged that each resilient arm, facing the inlet side of the bolt receiving hole, makes an acute angle with an inner wall of the bolt receiving hole so as to form a parallelogram by a portion of the inner wall of the receiving hole, the resilient arm in the inlet side portion of the receiving hole, the resilient arm in the outlet side portion of the receiving hole and the engagement portion supported by the resilient arms. This allows the engagement pawls to engage reliably with threads in any positions of the bolt and the resilient arms enable each of the engagement portions to contact the bolt appropriately and to engage with the bolt stably in a wide engagement area.

What is claimed is:

1. A bolt fastener (1) comprising a base (3) having a bolt receiving hole (2) formed to receive a bolt projecting from a panel therein, with the bolt receiving hole (2) including an inner wall (9) formed with a pair of opposed engagement means (10) for engagement with a threaded portion of the received bolt, characterised in that each of the engagement means (10) comprises a plurality of resilient arms (15,17) extending from the inner wall (9) of the bolt receiving hole (2) towards the centre of the hole (2), and a plate-like engagement portion (18) which is supported by the resilient arms (15,17) and extend longitudinally with respect to the bolt receiving hole (2), and the opposed surfaces of the engagement portions (18) are provided with a plurality of engagement pawls (19) translatedly arranged longitudinally with respect to the bolt receiving hole (2) for engagement with a threaded portion of the bolt.

2. A bolt fastener according to claim 1 characterised in that each of the engagement means (10) has four resilient arms (15,17) which support respectively the four corners of each engagement portion (18).

3. A bolt fastener according to claim 2 characterised in that each resilient arm (15,17) extends toward the inlet side of the bolt receiving hole (2), and makes an acute angle with the inner wall (9) of the bolt receiving hole (2), and each of the engagement means (10) defines a parallelogram formed by the engagement portion (18), the resilient arm (15) supporting a portion (18) of the engagement portion (18) on the inlet side of the receiving hole, the resilient arm (17) supporting a portion (18) of the engagement portion (18) on the outlet side of the receiving hole, and the inner wall (9) of the receiving hole (2).

4. A bolt fastener according to claim 3 characterised in that the portions of the inner wall (9) at the base of the resilient arms (15,17) are formed with cutouts (22) to enable the resilient arms (15,17) to change their shapes easily.

5. A bolt fastener according to claim 1 characterised in that the bolt receiving hole (2) of the base (3) is formed as an elongated hole to allow an offset of the bolt mounting positions on the panel, and the engagement portions (18) of the engagement means (10) are formed with a width corresponding to the elongated hole.

6. A bolt fastener according to claim 1 characterised in that the engagement portion (18) of each of the engagement means (10) is formed with a reinforcement rib (21) on the opposite side to the engagement pawls (19) thereof to ensure high rigidity of the engagement portion (18).

* * * * *